March 29, 1949.   N. G. THIELERS   2,465,668

SINGLE-PHASE SERIES COMMUTATOR MOTOR

Filed April 10, 1947

Inventor,
NILS GUSTAV THIELERS
By [signature]
Attorney.

Patented Mar. 29, 1949

2,465,668

UNITED STATES PATENT OFFICE 2,465,668

SINGLE-PHASE SERIES COMMUTATOR MOTOR

Nils Gustav Thielers, Vasteras, Sweden, assignor to Allmanna Svenska Elektriska Aktiebolaget, Vasteras, Sweden, a corporation of Sweden Application April 10, 1947, Serial No. 740,654
In Sweden April 10, 1946

4 Claims. (Cl. 318—244)

In single-phase series commutator motors, it is known to shunt the commutating pole winding by an ohmic resistance in order to obtain the right phase of the commutating flux. Hereby it is obtained, besides a component of the said flux in phase with the current which is the commutating flux proper, a component lagging 90° behind the current and serving to compensate the voltage induced in the short-circuited coil by the main flux varying in phase with the current. It is also known to connect the said shunting ohmic resistance in series with inductances for the purpose of providing the correct phase not only of the fundamental wave of the commutating flux but also of certain higher harmonics thereof. Experience has, however, proved that the result of such connection is not satisfactory.

According to the present invention, therefore, at least one portion of the resistive shunt is in its turn shunted by an inductance. In a preferred form, several portions of the resistive shunt are shunted by separate inductances. Experience as well as mathematical calculus has shown that in this way the right phase can be obtained for several higher harmonics of the commutating flux.

Figure 1:
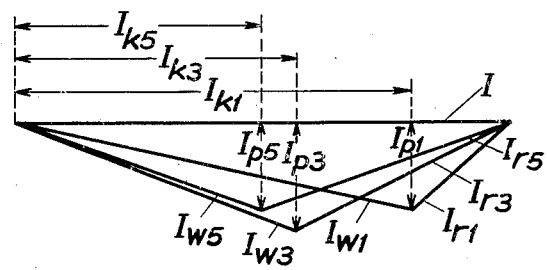
Figures 2, 3:
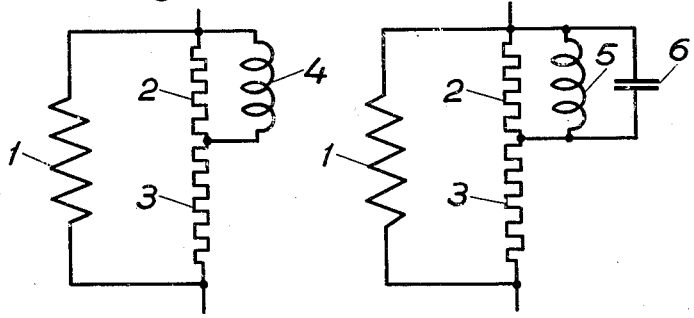
Figure 4:
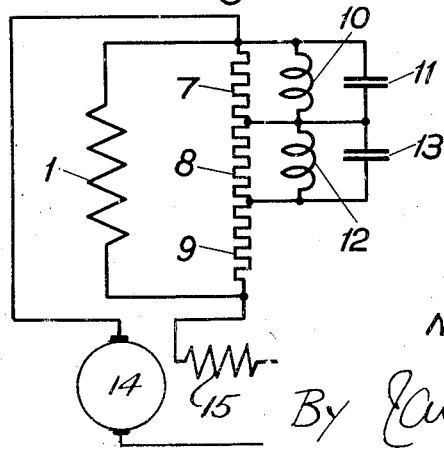

In the accompanying drawing, Fig. 1 shows a current diagram illustrating the behavior of the simple connection of an ohmic shunt to the commutating winding at different frequencies, while Figs. 2–4 show different forms of the invention.

In Fig. 1, the symbol $I_a$ designates the armature current of the motor, which divides itself in a component through the commutation winding and a component through the resistance in parallel thereto. The diagram comprises three different frequencies in the mutual proportion 1:3:5, corresponding to the fundamental wave of the current and to its third and fifth harmonic. For facilitating the understanding, the currents of the different frequencies are drawn to such scales that the total armature current is illustrated by the same vector I for all the frequencies. The fundamental wave is divided into a component $I_{w1}$ through the commutating winding and a component $I_{r1}$ through the parallel resistance. The former has, in its turn, a component $I_{k1}$ in phase with I, the commutation current proper, and a component $I_{p1}$ perpendicular thereto, corresponding to the pulsation voltage in the short-circuited coil.

For the triple frequency, the corresponding components $I_{w3}$, $I_{r3}$, $I_{k3}$ and $I_{p3}$ are obtained, and for the fivefold frequency the components $I_{w5}$, $I_{r5}$, $I_{k5}$ and $I_{p5}$. It is found, that for the same value of I, the component $I_{k3}$ only will be about 70% of $I_{k1}$ and $I_{k5}$ about 60% of $I_{k1}$. $I_{p3}$ is a trifle larger and $I_{p5}$ a trifle smaller than $I_{p1}$.

For giving a satisfactory commutation, however, $I_{k3}$ and $I_{k5}$ should be equal to $I_{k1}$, and $I_{p3}$ should preferably be three times $I_{p1}$ and $I_{p5}$ five times $I_{p1}$. As regards the latter quantities, this result is difficult to achieve in practice, but this is generally of minor importance, as the transformation voltage can be kept rather low in modern designs. The condition for $I_{k3}$ and $I_{k5}$ is more important. For approximately fulfilling it and improving the value of $I_p$ at least as regards the third harmonic, which in practice is the most important one, one of the connections shown in Figs. 2–4 can be used.

In Fig. 2, the commutation winding 1 of a single-phase commutating motor, other details of which are not shown, is connected in parallel to an ohmic resistor 2, 3, of which one portion 2 is shunted by a reactor 4. The proportion between ohmic resistance and reactance at the frequency of the fundamental wave should be substantially such as to make the phase displacement between the voltage across the combined impedance and the current therethrough of the order of magnitude 30°–45° for giving as good a commutation of the third harmonic as of the fundamental wave. The use of a parallel impedance of this type necessitates, however, some increase of the number of turns of the commutation winding, as compared with the use of a pure resistive shunt, for giving a good commutation of the fundamental wave. The ohmic value of the resistive portion of the shunt should also be increased by at least about thirty percent as compared with the usual value that is necessary in a purely resistive shunt for giving the best commutation of the fundamental wave.

A more exact compensation of the higher harmonics, which can be adapted to any harmonics, may be obtained by means of resonance circuits containing for instance capacitances and inductances. Fig. 3 shows an example of such a connection intended for one harmonic. The impedance connected in parallel to the commutation winding 1 here consists, as in Fig. 2, of two series connected ohmic resistors 2, 3, the resistor 2 being connected in parallel to a resonance circuit consisting of a reactor 5 and a condenser 6. The circuit is tuned to resonance with the most important harmonic. At the frequency of this harmonic, the circuit does not admit any resultant current, and only the sum of the resistances 2 and 3 therefore is active. For the fundamental wave, on the contrary, the circuit acts substantially as a reactance, whence the action becomes analogous to that obtained according to Fig. 2.

Fig. 4, finally, shows a complete motor with an armature 14 and a series exciting winding 15, the commutating winding 1 being also connected in series with the armature, and also shows a parallel impedance containing two resonance circuits, each connected in parallel to one portion of an ohmic resistor. One 7 of these portions is connected in parallel to an inductance 10 and a condenser 11, which for instance may be in resonance for the third harmonic, and the other portion 8 is connected in parallel to an inductance 12 and a condenser 13, which may be in resonance for the fifth harmonic. If some still higher harmonic should be especially prominent, a resonance circuit may of course be provided for the said harmonic in addition to or instead of those described.

I claim as my invention:

1. In a series-excited single-phase commutating motor, a commutating pole winding, a resistor of higher ohmic value than that giving alone proper commutation connected in parallel thereto, and a reactor connected in parallel to a portion of said resistor and in series with another portion thereof.

2. In a series-excited single-phase commutating motor, a commutating pole winding, a resistor of higher ohmic value than that giving alone proper commutation connected in parallel thereto and divided into portions, and reactors connected in parallel to some of said portions and in series with other portions of said resistor.

3. In a series-excited single-phase commutating motor, a resistor of higher ohmic value than that giving alone proper commutation connected in parallel thereto, and a reactor and a condenser connected in parallel to each other and to at least one portion of said resistor and in series with at least one portion thereof.

4. In a series-excited single-phase commutating motor, a commutating pole winding, a resistor connected in parallel thereto and divided into portions, and reactors and condenser mutually tuned to different frequencies connected in parallel to said portions.

NILS GUSTAV THIELERS.

REFERENCES CITED

The following references are of record in the file of this patent:

UNITED STATES PATENTS

| Number | Name | Date |
|---|---|---|
| 2,179,358 | Stix | Nov. 7, 1939 |